United States Patent [19]

Sato

[11] Patent Number: 5,287,338
[45] Date of Patent: Feb. 15, 1994

[54] ERROR SIGNAL GENERATION FOR LIGHT BEAM REFLECTED FROM OPTICAL DISK WITH PLURALITY OF LIGHT DETECTING ELEMENTS

[75] Inventor: Kenichi Sato, Tokyo, Japan

[73] Assignee: Teac Corporation, Tokyo, Japan

[21] Appl. No.: 889,613

[22] Filed: May 27, 1992

[30] Foreign Application Priority Data

May 30, 1991 [JP] Japan .................................. 3-127922

[51] Int. Cl.⁵ ............................................. G11B 7/095
[52] U.S. Cl. .............................. 369/44.23; 369/44.32; 369/44.41; 369/54
[58] Field of Search ............... 369/44.23, 44.25, 44.32, 369/44.41, 44.42, 54

[56] References Cited

U.S. PATENT DOCUMENTS

| | | | |
|---|---|---|---|
| 4,682,315 | 7/1987 | Vejima | 369/44.42 X |
| 5,144,606 | 9/1992 | Kadowaki | 369/44.41 |
| 5,151,887 | 9/1992 | Miyazaki | 369/44.41 X |

Primary Examiner—W. R. Young
Attorney, Agent, or Firm—Michael N. Meller

[57] ABSTRACT

A lens causes a first reflected light of a light beam reflected from an optical disk to converge on a first focal point. A splitter splits the first reflected light and causes a second reflected light to converge on a second focal point. The lens, the splitter, first and second light detectors are disposed so that the length of the light beam running from the lens to the second detector is different from the length of the light beam running from the lens to the first detector, and also, when the first reflected light is incident on the first detector, a line located within the illumination area formed on the first detector, which line corresponds to a center line of an information recording track formed on the optical disk, is substantially superimposed on a first boundary of the first detector, the illumination area being crossed by the second boundary, of the first detector, at some distance from the center point of the illumination area; and, when the second reflected light is incident, a line located within the illumination area formed on the second detector, which line corresponds to the center line of the information recording track formed on the optical disk, is substantially superimposed on a third boundary of the second detector, the illumination area being crossed by a fourth boundary of the second detector at some distance from the center point of the illumination area.

5 Claims, 13 Drawing Sheets

ERROR SIGNAL GENERATION FOR LIGHT BEAM REFLECTED FROM OPTICAL DISK WITH PLURALITY OF LIGHT DETECTING ELEMENTS

BACKGROUND OF THE INVENTION

The present invention generally relates to an error signal generator for use in an optical disk drive. Specifically, it relates to an error signal generator of an optical disk, which generator generates error signals by performing arithmetic operations on output signals from a light detecting means consisting of a plurality of photodiodes (light-sensitive elements).

An error signal generator for use in an optical disk drive, which generator uses a micro-prism detector shown in FIG. 1A, is known in prior art.

Referring to FIG. 1A, a laser beam 4 radiated from a laser diode 2 is turned into parallel rays by a collimator lens 5 before it is admitted into a reflecting prism 7 via a beam splitter 6. After being reflected by the prism 7, the laser beam 4 is made to converge by an object lens 8 and is then incident on a recordable side of an optical disk 1.

The laser beam 4 which is incident on the optical disk 1 is reflected by a reflecting film formed on the optical disk 1. The laser beam 4 reflected thereon is turned into parallel rays by the object lens 8 before it is reflected by the reflecting prism 7 and is incident on the beam splitter 6 to be reflected in the downward direction in the figure. After being passed through a half-wave plate 10, this first reflected light 9 is made to converge by a plano-convex lens 11 (converging means) on a first focal point 12.

Along the optical path of the first reflected light 9 is disposed a micro-prism detector 3 (hereinafter called an MPD) consisting of a polarizing beam splitter 13a (light splitting means) provided by forming a specified polarizing film on the overlapping portion of two prisms 13 and 14 mated with each other, the prisms 13 and 14, and light detectors 15 and 16. As the first reflected light 9 travels to the first focal point 12, it is also split by the polarizing beam splitter 13a and reflected by surface 14a of the prism 14. This second reflected light 17 is convergent at on a second focal point 18.

Referring to FIG. 1A, the light detector 15 (first light detecting means), disposed between the first focal point 12 and the polarizing beam splitter 13a, detects the first reflected light 9. In the figure, the light detector 16 (second light detecting means), disposed below the second focal point 18, detects the second reflected light 17.

The light detector 15 consists of a plurality of light-sensitive elements in the form of photodiodes 15a, 15b, and 15c, as shown in FIG. 1B. The photodiodes 15a and 15c are manufactured such that they are roughly of a semicircular shape. These photodiodes 15a and 15c constitute a circular light detector 15 by sandwiching a photodiode 15b of a roughly rectangular shape across respective boundaries 19a and 19b.

The light detector 15 is formed such that it has a symmetry with respect to a central line 19c. The light detector 15 is disposed such that the center of the first reflected light 9 is incident on the central line 19c.

The light detector 16 also consists of a plurality of light-sensitive elements in the form of photodiodes 16a, 16b, and 16c, and is configured in the same way as the light detector 15. The light detector 16 is disposed such that the center of the second reflected light 17 is incident on a central line 19d.

Outputs of the photodiodes included in the light detectors 15 and 16 are supplied to an operating means 20.

In an error signal generator for use in a conventional optical disk drive of the above-mentioned configuration, the operating means 20 performs specified arithmetic operations on the outputs of the photodiodes of the light detectors 15 and 16. An RF signal is obtained by a differential detection method, a focus error signal is obtained by a beam size detection method, and a tracking error signal is obtained by a sampling servo method.

A description of the principles of a beam size detection method will be given in accordance with FIGS. 2A through 2C, and 3A through 3C. In the figures, optical systems are drawn in a simplified manner. In FIGS. 2A through 2C, and 3A through 3C, components that are the same as the components of the light detectors shown in FIGS. 1A and 1B, are given the same reference notation, and the descriptions thereof are omitted.

FIGS. 2A and 3A show a condition in which the object lens 8 and the optical disk 1 are too close for the laser beam to be focused on the recordable side of the optical disk 1. The second reflected light 17 detected by the light detector 16 is smaller in area than the first reflected light 9 detected by the light detector 15. The regions on the photodiodes 15 and 16 illuminated by the first and second reflected lights 9 and 17, respectively, are shown as circle areas and hatched areas in the figures, the former representing areas illuminated by the 0 order diffracted light, and the latter representing areas illuminated by the ±1 order diffracted light.

FIGS. 2B and 3B show a condition in which the distance between the object lens 8 and the optical disk 1 is the specified distance, and thus the light is focused. In this case, the area illuminated by the first reflected light 9 as it is incident on the light detector 15, and the area illuminated by the second reflected light 17 as it is incident on the light detector 16 are the same.

FIGS. 2C and 3C show a condition in which the distance between the object lens 8 and the optical disk 1 is longer than the specified distance, and thus the light is not focused. In this case, the area illuminated by the second reflected light 17 as it is incident on the light detector 16 is larger than the area illuminated by the first reflected light 9 as it is incident on the light detector 15.

Specified arithmetic operations are then performed on outputs from a plurality of photodiodes constituting each of the light detectors 15 and 16. These operations allow detection of the difference between the dimensions of the area illuminated by the first reflected light 9 and that illuminated by the second reflected light 17 as the lights are incident on the light detectors 15 and 16. These operations enable the obtaining of an error signal that indicates an error of the laser beam focus with respect to the specified illumination condition on the optical disk 1. This method is called beam size detection method because a focus error signal is obtained from the difference in the dimensions of illumination areas of each of the reflected lights 9 and 17 on each of the light detectors 15 and 16.

Given that output currents of each of the photodiodes 15a, 15b, 15c, 16a, 16b and 16c are $I_{15a}$, $I_{15b}$, $I_{15c}$, $I_{16a}$, $I_{16b}$, and $I_{16c}$ respectively, a focus error signal FE that indicates the error of focal position of the laser beam along the direction of the illumination can be obtained as follows;

$$FE = I_{15a} + I_{15c} + I_{16b} - (I_{15b} + I_{16a} + I_{16c}) \quad (1)$$

While the dimensions of the areas illuminated by the reflected light 9 and 17 are different between FIGS. 3A and 3C, the total luminous energy received by each photodiode is approximately the same in the two conditions. Thus, the total luminous energy received by each of the photodiodes $15a$-$15c$ constituting the light detector 15, and the total luminous energy received by the photodiodes $16a$-$16c$ constituting the light detector 16 are approximately the same. On the other hand, as the illumination area on each light detector varies, the ratio of luminous energy received by each of three photodiodes $15a$-$15c$ and each of three photodiodes $16a$-$16c$, constituting the light detectors respectively, varies. The formula (1) above is used in obtaining the ratio of luminous energy received by each of the photodiodes within the same light detector.

As is generally known, a tracking error signal TE, obtained by a sampling servo method to be described later, is given by $$TE = I_{15a} + I_{15b} + I_{15c} \quad (2)$$

or $$TE = I_{16a} + I_{16b} + I_{16c} \quad (2)'$$

or $$TE = I_{15a} + I_{15b} + I_{15c} + I_{16b} + I_{16c} \quad (2)''$$

A tracking error signal is defined as a signal that indicates an error, with respect to the center, in the direction of the tracking by a laser beam. A sampling servo method can be performed on an optical disk (having a sampling format) manufactured so that a pair of pits are provided separately on both sides of each information recording track. By comparing the intensity of light reflected from these pits, a tracking error signal is obtained.

An RF (Radio Frequency) signal corresponding to the information recorded on the optical disk 1 can be obtained by determining the difference between the outputs of each of the light detectors 15 and 16. That is, it is calculated as per the following equation.

$$RF = I_{15a} + I_{15b} + I_{15c} - (I_{16a} + I_{16b} + I_{16c}) \quad (3)$$

As is generally known, this calculation is arrived at because in reproducing RF signals of a magneto-optical disk (MO disk), two prisms 13 and 14, which constitute the MPD 3, are configured such that the two kinds of reflected light 9 and 17, resulting from being passed through these prisms 13 and 14, have different polarization components and contain RF signal components that are 180 degrees out of phase.

The above-mentioned focus error signal, tracking error signal, and RF signal are obtained by means of an arithmetic circuit (operating means) comprising, for example, OP amplifiers (Operational Amplifiers).

A description will be given below of an arithmetic circuit in accordance with FIG. 4. In FIG. 4, components that are the same as the components of the light detectors 15 and 16 shown in FIGS. 3A through 3C are given the same reference notation and the descriptions thereof are omitted.

As can be seen in the figure, each of the output currents $I_{15a}$, $I_{15b}$, $I_{15c}$, $I_{16a}$, $I_{16b}$, and $I_{16c}$ from each of the light detectors 15 and 16, are supplied to an arithmetic circuit 23 (operating means) comprising a plurality of OP amplifiers. The specified operations shown in the formulas (1), (2), and (3) are performed, a focus error signal is output to a terminal 24, a tracking error signal obtained by sampling servo method is output to a terminal 25, and an RF signal is output to a terminal 26.

In accordance with the above-mentioned error signal generator, of an optical disk drive equipped with an MPD, for generating a tracking error signal by means of a sampling servo method, and for generating a focus error signal and an RF signal, no special optical parts are necessary. Special optical parts in this case include a cylindrical lens needed in an astigmatic focus error signal generating method and an edge prism needed in Foucault's method of focus error signal generating.

The prisms 13 and 14 constituting an MPD 3 are, like the other prisms used in an optical disk drive, easily obtainable and inexpensive compared with such special optical parts as a cylindrical lens or an edge prism. Therefore, using an MPD provides an advantage that an optical system can be configured from inexpensive optical parts.

The conventional error signal generating method using an MPD is, as described above, an effective technology when a sampling servo method, which is applied to an optical disk having a sampling format, is employed in the generation of a tracking error signal. However, when a push-pull method (described later), which is applied to an optical disk having a pregroove format, is employed in generating a tracking error signal, obtaining a tracking error signal with a good linearity is difficult. Pregroove formatting of an MO disk means forming, at the time of manufacturing, a spiral-shaped continuous pregroove so that it accommodates, at a specified interval, address information that indicates position (address) on a disk.

It is provided by standards that a general-purpose 3.5 inch MO (Magneto Optics) disk should be pregroove formatted. For a 3.5 inch pregroove formatted MO disk, a tracking error signal needs to be generated by means of a push-pull method.

A description will be given below, with reference to FIG. 5 and FIGS. 6A through 6C, of a tracking error signal generating method using a push-pull method. Referring to FIG. 5, an optical disk 1 is pregroove formatted. That is, grooves $1a$, $1b$, $1c$, $1d$, and $1e$ are formed on the optical disk 1. Reflected light 9 of a laser beam reflected from the groove $1a$, after being turned into parallel rays by an object lens not shown in the figure, is made to converge by a plano-convex lens 11 and is incident on a light detector 27.

The light detector 27 consists of two symmetrical photodiodes $27a$ and $27b$, positioned opposite to each other. Outputs of the photodiodes $27a$ and $27b$ are input into an OP amplifier 28. This OP amplifier 28 calculates the difference between the outputs of each of the photodiodes $27a$ and $27b$, thus allowing a generation of a tracking error signal.

FIG. 6A shows a condition in which a laser beam 9 illumination area on the optical disk 1 is displaced toward the left of the groove $1a$ in the figure (such a displacement of the laser beam 9 with respect to the direction of tracking shall be called a tracking displacement hereafter). FIG. 6C shows a condition in which the laser beam 9 illumination area is displaced toward the right of the groove 1a in the figure. Broken lines in FIGS. 6A through 6C represent optical paths and illumination areas, on the light detector 27, of the ±1 order diffracted light of the laser beam 9. The hatched areas represent illumination areas of ±1 order diffracted light within illumination areas of 0 order diffracted light resulting from the laser beam 9 as it is incident on the light detector 27.

In the conditions shown in FIGS. 6A and 6C, the illumination areas, on the light detector 27, of these ±1 order diffracted lights 9a and 9b, are asymmetric with respect to a boundary 27c on the photodiodes 27a and 27b. Therefore, a tracking error signal obtained through a subtractive operation by the OP amplifier 28, as described above, on the outputs of the photodiodes 27a and 27b shows either a positive or a negative value.

FIG. 6B shows a condition in which the laser beam 9 illumination area on the optical disk 1 is aligned with the center of the tracking direction, that is, the laser beam 9 center is incident on the center of the groove 1a. The light detector 27 is disposed so that this illumination area, on the light detector 27, illuminated by the ±1 order diffracted lights 9a and 9b resulting from the laser beam 9, is symmetrical with respect to the boundary 27c. Under this condition, the tracking error signal output from the OP amplifier operation is nil.

In accordance with the above-mentioned push-pull method, the light detector is disposed so that the center of the light reflected from the optical disk having a pregroove format hits the boundary of the photodiodes on the light detector split symmetrically into two photodiodes. An output signal in proportion to the dimensions of the illumination area on the light detector, is output from each of the above-mentioned photodiodes to the OP amplifier. The OP amplifier calculates the difference between the output signals so that a tracking error signal is obtained. This push-pull method is applied to a 3.5 inch MO disk, which is required by standards to have a pregroove format.

However, in an MPD of a conventional error signal generator of an optical disk drive, the photodiodes 15b and 16b roughly of rectangular shape are located in the center of each of the light detectors. Further, the first and second reflected lights are incident so that the center of the first and second reflected light beams hit the central line of each of the photodiodes 15b and 16b respectively. Thus, the generation of a tracking error signal in accordance with the push-pull method requires that the photodiodes 15a, 15c, 16a, and 16c, in exclusion of 15b and 16b, be used to obtain the difference between the two symmetrical regions. This has an adverse effect in that linearity of a tracking error signal thus obtained is degraded due to the fact that luminous energy of the illumination on the above-mentioned roughly rectangular photodiodes 15b and 16b are excluded from the calculation.

SUMMARY OF THE INVENTION

Accordingly, a general object of the present invention is to provide an error signal generating device, and means in accordance with a conventional MPD method, in which a disk having a pregroove is employed, and a tracking error signal with good linearity is obtained by means of a push-pull method. In order to achieve the object, the error signal generator of the present invention is configured such that the error signal generator comprises:

converging means for causing a first reflected light resulting from a light beam being reflected by an optical disk to converge at a first focal point;

light splitting means for splitting the first reflected light and for causing a second reflected light to converge at a second focal point;

a first light detecting means comprising a plurality of light-sensitive elements for detecting the first reflected light, the first light detecting means configured such that the plurality of light-sensitive elements have at least two boundaries, on which boundaries the light-sensitive elements are in contact, that is at least a first boundary and a second boundary;

a second light detecting means comprising a plurality of light-sensitive elements for detecting the second reflected light, the second light detecting means configured such that the plurality of light-sensitive elements have at least two boundaries, on which boundaries the light-sensitive elements are in contact, that is at least a third boundary and a fourth boundary; and operating means for generating an error signal by performing an arithmetic operation on the outputs of the first and second light detecting means, wherein the error signal indicates an error with respect to the specified condition of an illumination of the light beam on the optical disk, and wherein the converging means, the light splitting means, the first light detecting means, and the second light detecting means are disposed so that, when the first reflected light is incident on the detector, the position, in the illumination area on the first light detecting means, that corresponds to the information recording track on the optical disk, lies approximately on the first boundary of the first light detecting means, and this illumination area is crossed by the second boundary at at least some distance from the center of the illumination area; and when the second reflected light is incident on the second light detecting means, the position, in the illumination area of the second light detecting means, that corresponds to the information recording track on the optical disk, lies approximately on the third boundary on the second light detecting means, and this illumination area is crossed by the fourth boundary at least some distance from the center of the illumination area.

In accordance with the above-mentioned configuration, a focus error signal is obtained by comparing luminous energy of two regions in the illumination area of the reflected lights illuminating each light detecting means across the second and/or fourth boundary. Further, a tracking error signal is obtained by means of a push-pull method by comparing luminous energy of two regions in the illumination area of the reflected lights illuminating each of the two light detecting means across the first and/or third boundary.

Because a tracking error signal generation by means of push-pull method is thus possible, a pregrooved disk is usable. Moreover, the first and/or third boundary are disposed in the position within the illumination area of each reflected light, that corresponds to the track on the disk, thus assuring a tracking error signal with good linearity.

Because precision tracking control is possible using the tracking error signal with good linearity thus obtained, crosstalk, arising from contamination due to reading information on an adjacent track on the disk, is prevented.

Other objects and further features of the present invention will be apparent from the following detailed description when read in conjunction with the accompanying drawings.

DESCRIPTION OF THE PREFERRED EMBODIMENTS

A description will be given of an embodiment of the present invention in accordance with the figures.

Figure 1A:
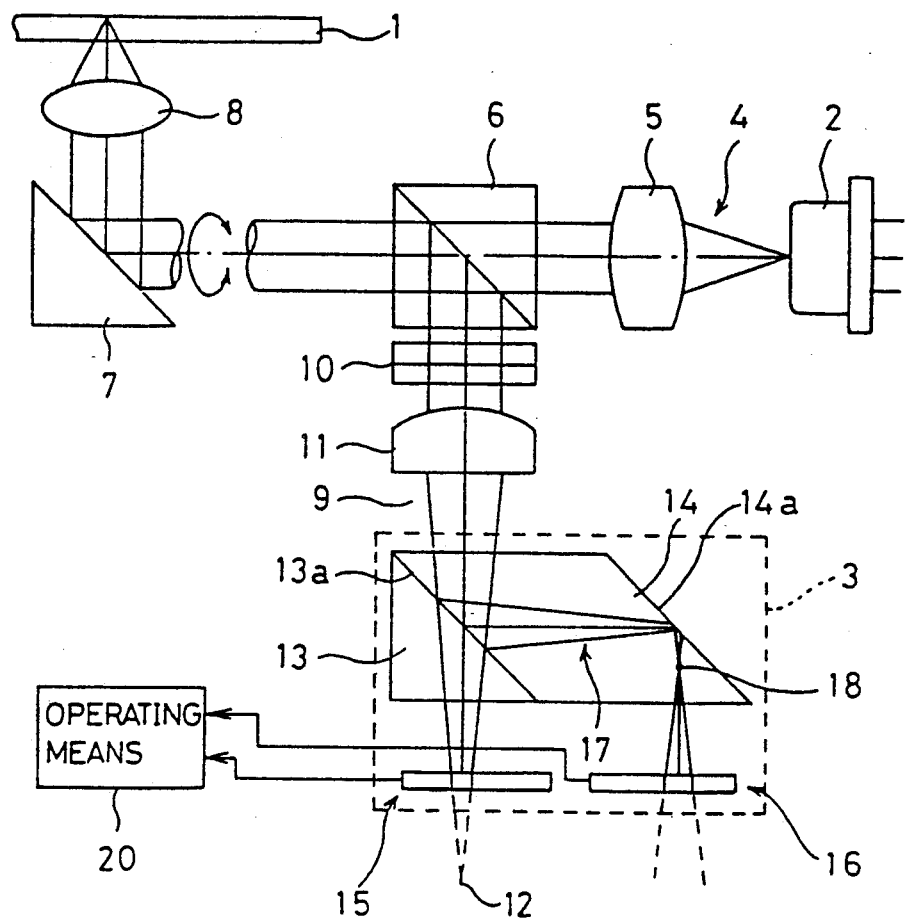
FIGS. 1A and 1B are respectively a diagram of an error signal generator of an optical disk, using a conventional micro-prism detector, and top views illustrating light detectors used therein.
Figure 1B:
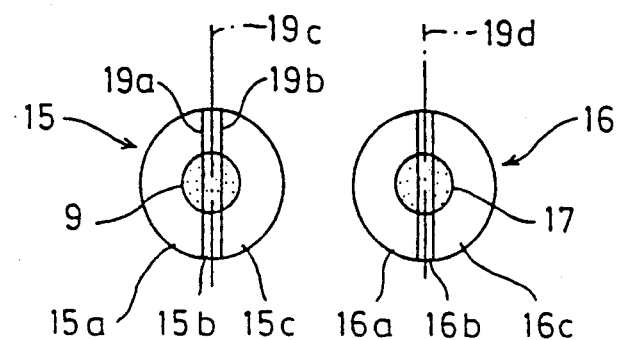
Figure 2A:
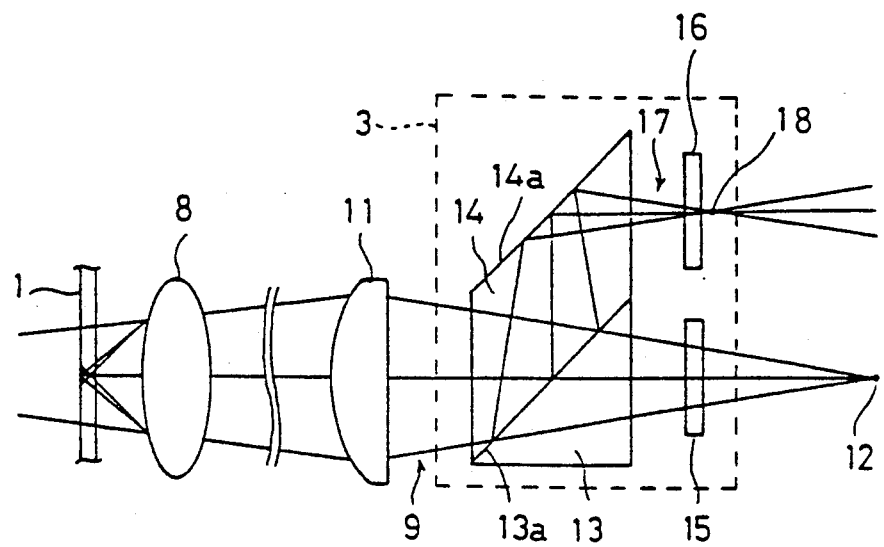
FIGS. 2A through 2C are diagrams of a configuration of an error signal generator for describing the principles of a beam size detection method.
Figure 2B:
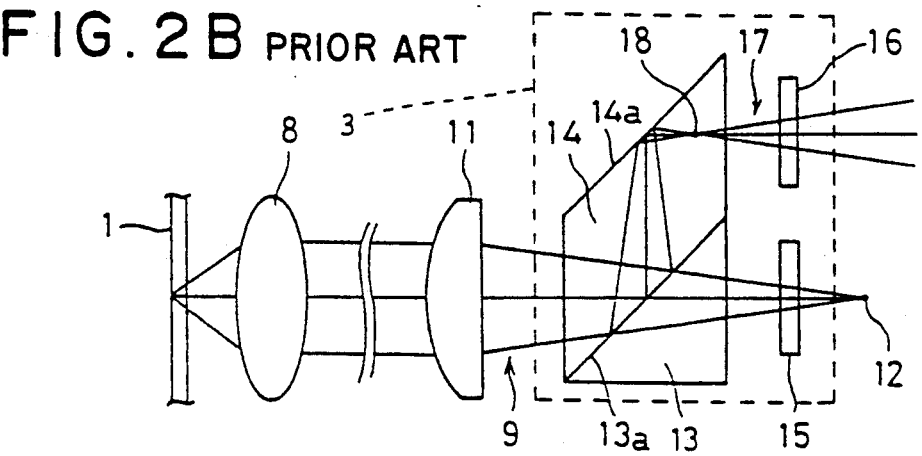
Figure 2C:
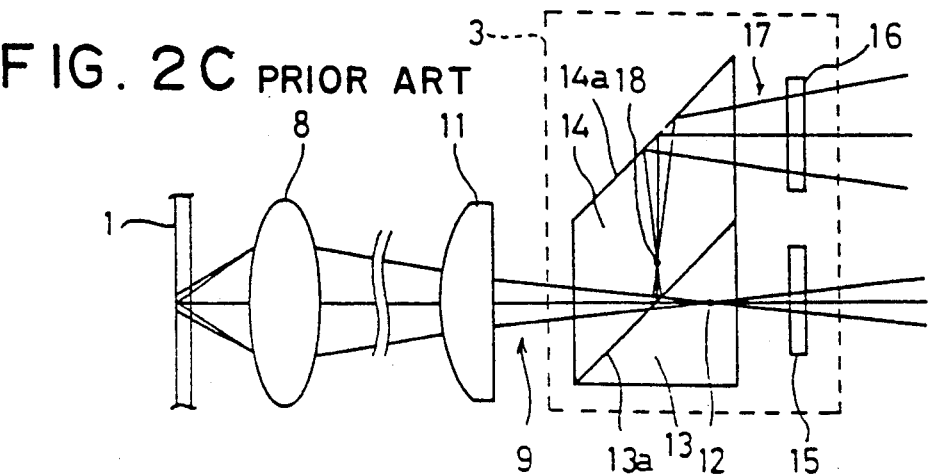
Figure 7A:
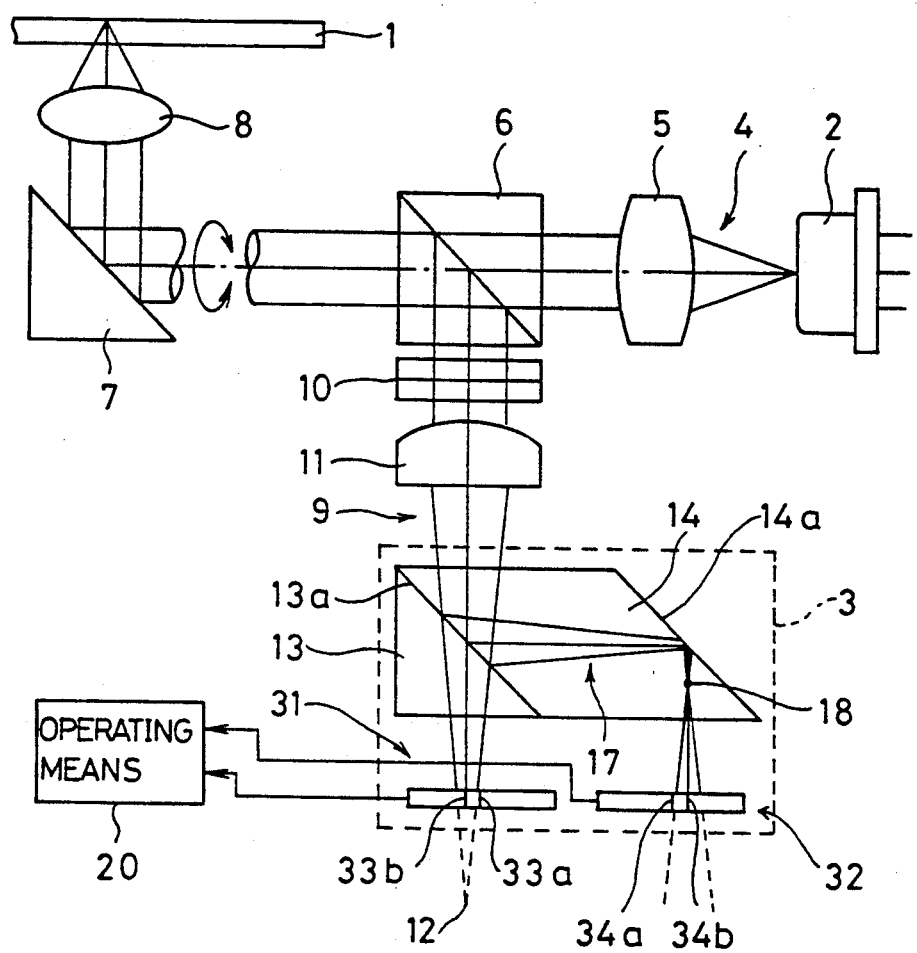
FIGS. 7A and 7B are respectively a diagram of an error signal generator of an optical disk of an embodiment of the present invention, and a top view of light detectors used therein.
Figure 7B:
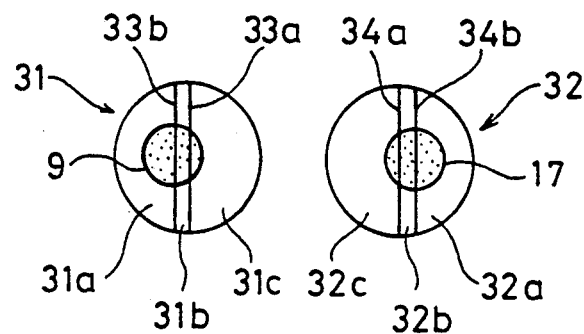

First a description will be given of a configuration of an embodiment of an error signal generator according to the present invention, by referring to FIGS. 7A and 7B. In FIGS. 7A and 7B, components that are the same as those of FIGS. 1A and 1B are designated by the same reference notations and the descriptions thereof are omitted.

In FIG. 7A, a light detector 31 (first light detecting means) is disposed between a first focal point 12 and a polarizing beam splitter 13. A first reflected light 9 is incident on this light detector 31, and is detected thereby. In FIG. 7a, below a second focal point 18 a light detector 32 (second light detecting means) is disposed. A second reflected light 17 is incident on this light detector 32 and is detected thereby.

The light detector 31 consists of a plurality of light-sensitive elements in the form of photodiodes 31a, 31b, and 31c. A semicircular photodiode 31c is so provided that it is a result of splitting the circular light detector 31 into semicircles, a boundary 33a of a semicircle being a diameter of the circular light detector 31.

A roughly semicircular photodiode 31a is bordered by a roughly rectangular photodiode 31b across the boundary 33b. A photodiode 31b is bordered by the photodiode 31c across the boundary 33a. The boundaries 33a and 33b are parallel to each other. Of these two, the boundary 33a functions as the aforementioned second boundary, and the boundary 33b functions as the aforementioned first boundary.

The light detector 32 also consists of a plurality of light-sensitive elements in the form of photodiodes 32a, 32b, and 32c. A boundary 34a of a semicircle is a diameter of the circular light detector 32. The photodiode 32a is roughly semicircular, and is bordered by the roughly rectangular photodiode 32b across a boundary 34b. The rectangular photodiode 32b is bordered by the photodiode 32c across the boundary 34a. The boundaries 34a and 34b are parallel to each other. The boundary 34a functions as the aforementioned fourth boundary, and the boundary 34b functions as the aforementioned third boundary.

As shown in FIG. 7B, the light detector 31 is configured such that the center of the first reflected light 9 hits the boundary 33b on the light detector 31. The light detector 32 is configured such that the center of the second reflected light 17 hits the boundary 34b on the light detector 32.

Outputs from each of the photodiodes constituting each of the light detectors 31 and 32, are supplied to an operating means 20. Arithmetic operations are performed on these outputs by the operating means 20 so that an error signal is obtained.

Figure 8A:
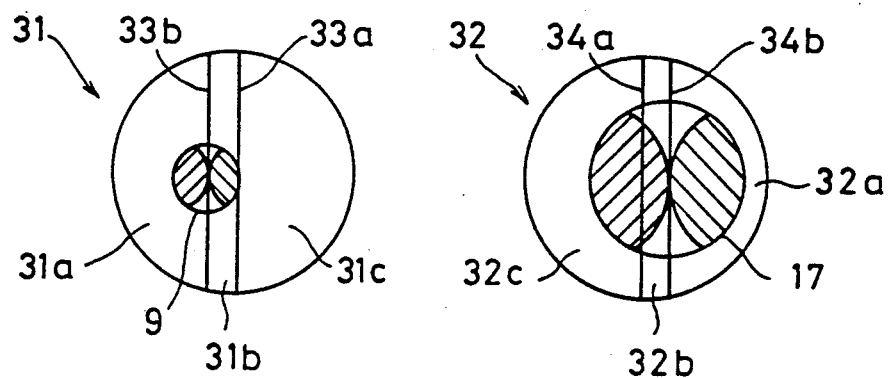
FIGS. 8A through 8C are top views of light detectors used in an error signal generator of an optical disk drive of an embodiment of the present invention.
Figure 8B:
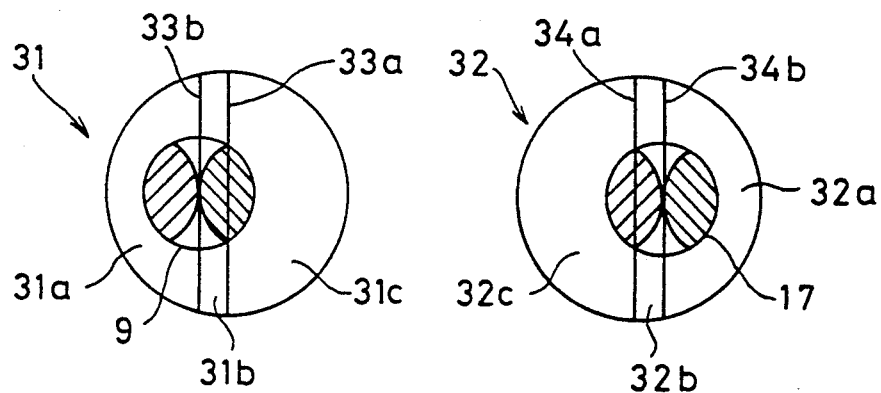
Figure 8C:
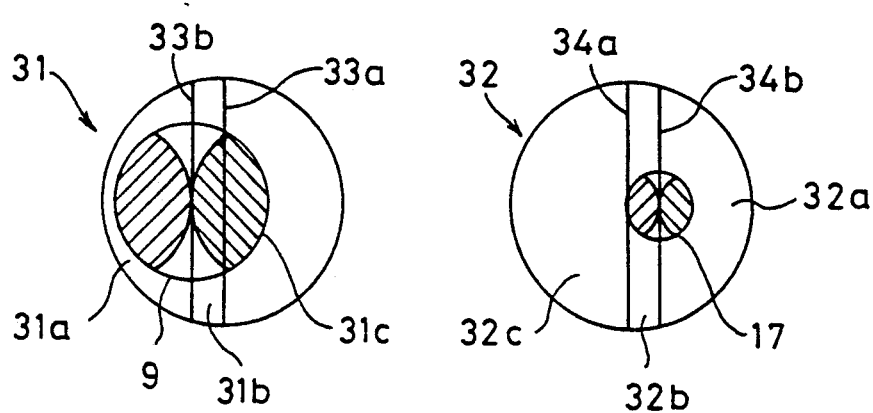

A description will be given of an error signal generation method in an embodiment of the error generator of the present invention, by referring to FIGS. 8A through 8C. FIG. 8A shows a condition in which the distance between the object lens 8 and the optical disk 1 is greater than a predetermined value. In this condition, a laser beam is not focused on a recordable side of the optical disk 1. FIG. 8C shows a condition in which the distance is smaller than a predetermined value. In this condition also, the laser beam is not focused on the recordable side of the optical disk 1. FIG. 8B shows a condition in which the above-mentioned distance is the specified predetermined distance, and the laser beam is focused on the recordable side of the optical disk.

As shown in FIGS. 8A through 8C, the illumination areas (hatched areas in the figures) of the ±1 order diffracted light resulting from the first and second reflected light 9 and 17, within the illumination area of the 0 order, are symmetrical on the light detectors 31 and 32 with respect to the boundaries 33b and 34b on the light detectors 31 and 32.

With the use of an MPD method error signal generator configured as shown in FIGS. 7A through 8C, an error signal is obtained as follows, by performing an arithmetic operation on the outputs of each of the photodiodes 31a, 31b, 31c, 32a, 32b, and 32c constituting each of the light detectors 31 and 32.

Given that the output currents of each of the photodiodes 31a, 31b, 31c, 32a, 32b, and 32c are $I_{31a}$, $I_{31b}$, $I_{31c}$, $I_{32a}$, $I_{32b}$, and $I_{32c}$ respectively, a focus error signal $FE$ is given by $$FE = I_{31a} + I_{31b} + I_{32c} - (I_{31c} + I_{32a} + I_{32b}). \quad (4)$$

This is a formula used in calculating the ratio between the dimensions of two illumination areas, illuminated by the reflected light 9, across the second boundary 33a on the first light detector, and also in calculating the ratio between the dimensions of two illumination areas, illuminated by the reflected light 17, across the fourth boundary 34a on the second light detector 32.

A tracking error signal TE, which is obtained by push-pull method, is $$TE = I_{31a} + I_{32a} - (I_{31b} + I_{31c} + I_{32b} + I_{32c}) \quad (5)$$

or $$TE = I_{31a} - (I_{31b} + I_{31c}) \quad (5)'$$

or $$TE = I_{32a} - (I_{32b} + I_{32c}). \quad (5)''$$

These formulas (5), (5)', and (5)'' are for calculating the ratio between the dimensions of two illumination areas, illuminated by the reflected light 9, across the first boundary 33b, on the light detectors 31; and also for calculating the ratio between the dimensions of two illumination areas illuminated by the reflected light 17, across the boundary 34b, on the light detectors 32. In FIGS. 7B, and 8A through 8C, the reflected light 9 and 17 are inverted right-to-left when refracted by the prisms 13 and 14 of FIG. 7A.

As shown in the formulas (5)' and (5)'', a tracking error signal TE can be obtained on the basis of either one of the light detectors 31 and 32. However, an S/N ratio thereof is comparatively poor due to the luminous energy being reduced by half in comparison with using both of the light detectors 31 and 32, in other words calculating according to the formula (5).

An RF signal corresponding to the information recorded on the optical disk 1 is obtained in accordance with the same principle applied in the description of the aforementioned formula (3). That is, the difference between the outputs of each of the light detectors 31 and 32 is determined according to the following formula.

$$RF = I_{31a} + I_{31b} + I_{31c} - (I_{32a} + I_{32b} + I_{32c}). \quad (6)$$

The above-mentioned arithmetic operations for obtaining a focus error signal FE, a tracking error signal TE, and RF signal RF, are performed by an arithmetic circuit constituted of OP amplifiers.

Figure 9:
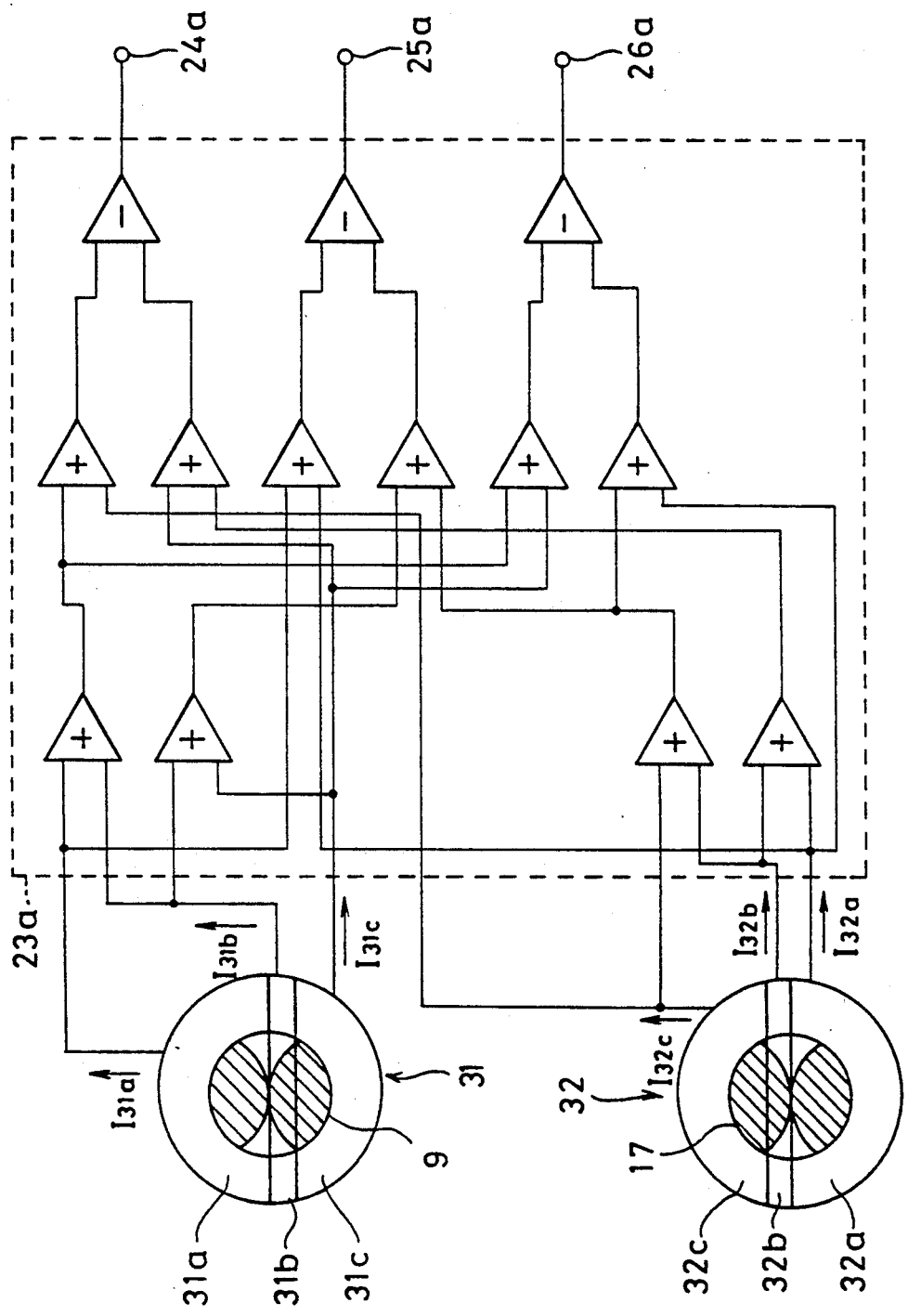
FIG. 9 is a block diagram of an example of an arithmetic circuit of an error signal generator of an optical disk drive of an embodiment of the present invention.

A description of the arithmetic circuit will be given by referring to FIG. 9. In FIG. 9, components that are the same as the components shown in FIGS. 8A through 8C are designated by the same reference notations, and the descriptions thereof will be omitted.

As shown in FIG. 9, each of the output currents $I_{31a}$, $I_{31b}$, $I_{31c}$, $I_{32a}$, $I_{32b}$, and $I_{32c}$ of the photodiodes constituting the light detectors 31 and 32 are supplied to an operating means 23a consisting of a plurality of OP amplifiers. In the operating circuit 23a, triangles containing the symbol + inside represent adder circuits that output each a sum of two inputs, and triangles containing the symbol "−" inside represent subtracter circuits that output each a difference between two inputs. This operating circuit 23a performs specified addition and subtraction operations indicated in the formulas (4), (5), and (6), on each of the output currents $I_{31a}$, $I_{31b}$, $I_{31c}$, $I_{32a}$, $I_{32b}$, and $I_{32c}$ of the photodiodes. As a result, a focus error signal is obtained at an output terminal 24a, a tracking error signal in accordance with a push-pull method is obtained at an output terminal 25a, and an RF signal is obtained at an output terminal 26a.

Figure 10A:
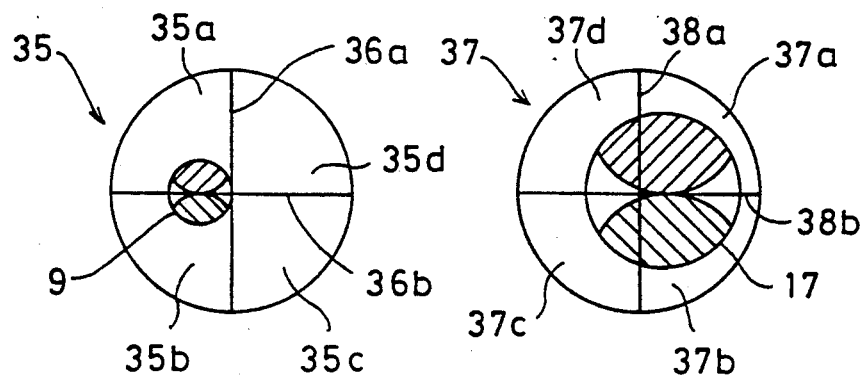
FIGS. 10A through 10C are top views of light detectors used in an error signal generator of an optical disk drive of another embodiment of the present invention.
Figure 10B:
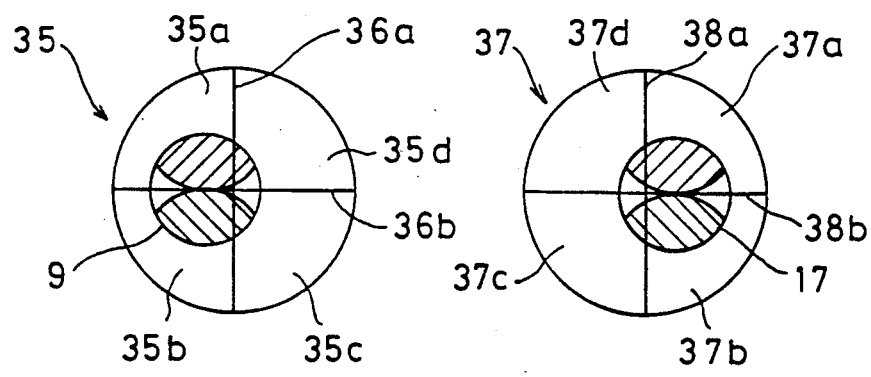
Figure 10C:
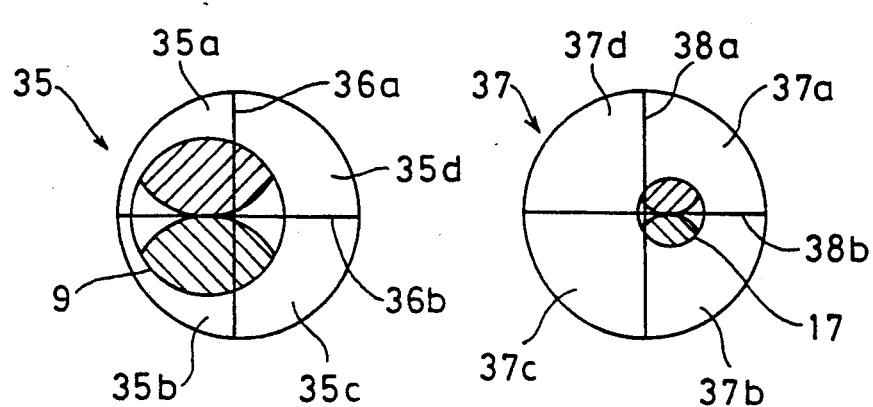

A description will be given below of an error signal generating method in another embodiment of an error signal generator of the present invention. FIG. 10A shows a condition in which the distance between the object lens 8 and the optical disk 1 is larger than a predetermined value. In this condition, the laser beam is not focused on the recordable side of the optical disk 1. FIG. 10C shows a condition in which the distance is smaller than a predetermined value. In this condition, the laser beam is not focused on the recordable side of the optical disk either. FIG. 10B shows a condition in which the distance is the specified predetermined distance and the laser beam is focused on the recordable side of the optical disk 1.

In the configuration shown in FIGS. 10A through 10C, it is the horizontal direction of each illumination area, illuminated by the reflected lights 9 and 17, on each light detector that corresponds to the direction in which tracks run on the disk. In the configuration of the first embodiment shown in FIGS. 8A through 8C, however, it is the vertical direction of each illumination area that corresponds to the direction in which tracks run on the disk. The direction on each illumination area, illuminated by each reflected light, that corresponds to the direction in which tracks run on the disk, can be set at will by rotating the MPD 3 degrees around the axis in the direction of incidence of light through the lens 11 of the MPD 3 in FIG. 7A.

A light detector 35 is circular in shape. It consists of a plurality of light-sensitive elements in the form of photodiodes 35a, 35b, 35c, and 35d. These photodiodes 35a through 35d are so manufactured that they comprise four equally-sized sectors as a result of the circular light detector 35 being divided by the boundaries 36a and 36b, which are perpendicular to each other and pass through the center of the light detector 35. The boundaries 36a and 36b function as the second and first boundary respectively.

A light detector 37 is also circular in shape. A plurality of light-sensitive elements, in the form of photodiodes 37a, 37b, 37c, and 37d, are so manufactured that they comprise four equally-sized sectors as a result of the circular light detector 36 being divided by the boundaries 38a and 38b in the same manner as the boundaries 36a and 36b above. The boundaries 38a and 38b function as the fourth and third boundaries respectively.

As shown in each of FIGS. 10A through 10C, the light detector 35 is disposed so that the center of the irradiating first reflected light 9 hits the boundary 36b on the light detector 35. The light detector 37 is disposed so that the center of the irradiating second reflected light 17 hits the boundary 38b on the light detector 37.

The light detectors 35 and 37 are configured such that the illumination areas (the hatched areas in the figure), on the light detectors 35 and 37, of the ±1 order diffracted light resulting from the first and second reflected lights 9 and 17 within the areas illuminated by the 0 order diffracted light, are symmetrical with respect to the respective boundaries 36b and 38b on the light detectors 35 and 37.

In the embodiments shown in FIGS. 10A through 10C, an error signal generator of FIG. 7A is configured such that the illumination area of the first and second reflected lights 9 and 17 on the light detectors 35 and 37 is rotated 90 degrees from the one in the embodiment shown in FIGS. 8a through 8C. As shown in FIGS. 10A through 10C, this configuration allows the first and second reflected lights 9 and 17 to be disposed side by side, while allowing the +1 order diffracted light and the −1 order diffracted light, resulting from each of the reflected lights 9 and 17, to be disposed one on top of the other.

The configuration of the light detectors 35 and 37 shown in FIGS. 10A through 10C, and the configuration of an error signal generator using an MPD that permits the specified illumination condition of each of the reflected lights 9 and 17 being provided, an error signal is obtained in the following manner, by performing specified operations on each of the outputs of the photodiodes $35a$, $35b$, $35c$, $35d$, $37a$, $37b$, $37c$, and $37d$ constituting each of the light detectors 35 and 37.

Given that each the output currents of each of the photodiodes $35a$, $35b$, $35c$, $35d$, $37a$, $37b$, $37c$, and $37d$ are $I_{35a}$, $I_{35b}$, $I_{35c}$, $I_{35d}$, $I_{37a}$, $I_{37b}$, $I_{37c}$, and $I_{37d}$, a focus error signal FE is given by $$FE = I_{35a} + I_{35b} + I_{37c} + I_{37d} - (I_{35c} + I_{35d} + I_{37a} + I_{37b}). \quad (7)$$

This formula is the one used in calculating the ratio between the dimension of two illumination areas illuminated by the reflected light 9, across the second boundary $36a$, on the first light detector 35; and also in calculating the ratio between the dimensions of two illumination areas illuminated by the reflected light 17, across the fourth boundary $38a$, on the second light detector 37.

A tracking error signal TE obtained by means of a push-pull method is $$TE = I_{35a} + I_{35d} + I_{37b} + I_{37c} - (I_{35b} + I_{35c} + I_{37a} + I_{37d}) \quad (8)$$

or $$TE = I_{35a} + I_{35b} - (I_{35b} + I_{35c}) \quad (8)'$$

or $$TE = I_{37b} + I_{37c} - (I_{37a} + I_{37d}). \quad (8)''$$

These formulas (8), (8)′, and (8)″ are for calculating the ratio between the dimensions of two illumination areas illuminated by the reflected light 9, across the first boundary $36b$, on the first light detector 35; and also for calculating the ratio between the dimensions of two illumination areas illuminated by the reflected light 17, across the third boundary $38b$, on the light detector 37.

As shown by the formulas (8)′ and (8)″, a tracking error signal TE can be obtained on the basis of either one of the light detectors 35 and 37. However, an S/N ratio thereof is comparatively poor because of luminous energy being reduced by half in comparison with using both of the light detectors 36 and 37 for the calculation, in other words, calculating according to the formula (8).

An RF signal corresponding to the information recorded on the optical disk 1 is obtained in accordance with the same principle applied in the description of the aforementioned formula (3). That is, the difference between the outputs of each of the light detectors 35 and 37 is determined according to the following formula.

$$RF = I_{35a} + I_{35b} + I_{35c} + I_{35d} - (I_{37a} + I_{37b} + I_{37c} + I_{37d}). \quad (9)$$

Figure 11:
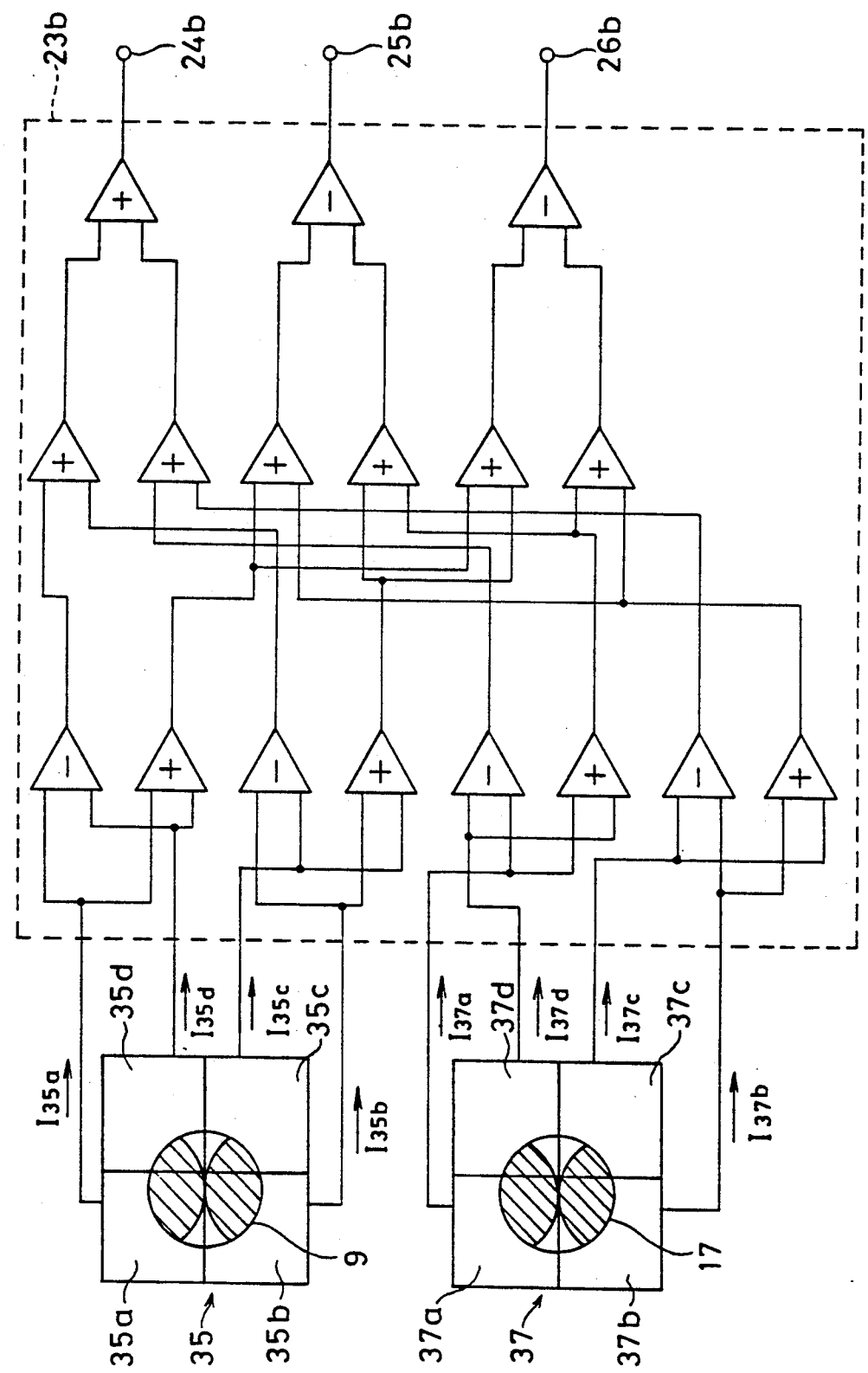
FIG. 11 is a block diagram of an example of an arithmetic circuit of an error signal generator of an optical disk drive of the embodiment of the present invention shown in FIGS. 10A and 10C.
Figure 12A:
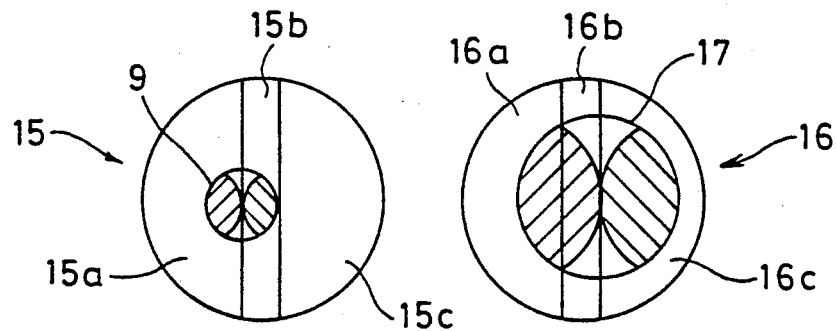
FIGS. 12A through 12C are top views of light detectors used in an error signal generator of an optical disk of yet another embodiment of the present invention.
Figure 12B:
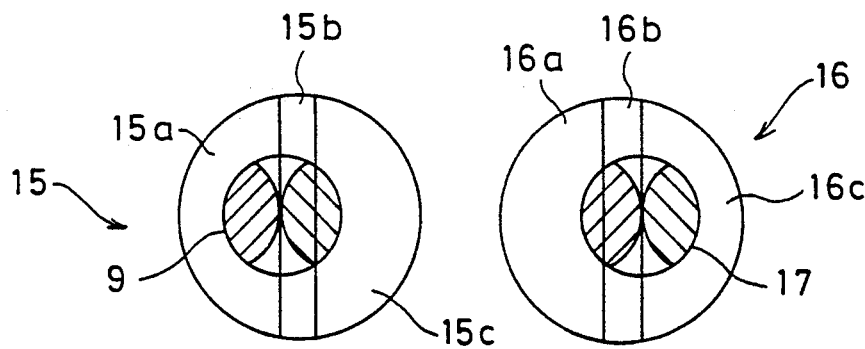
Figure 12C:
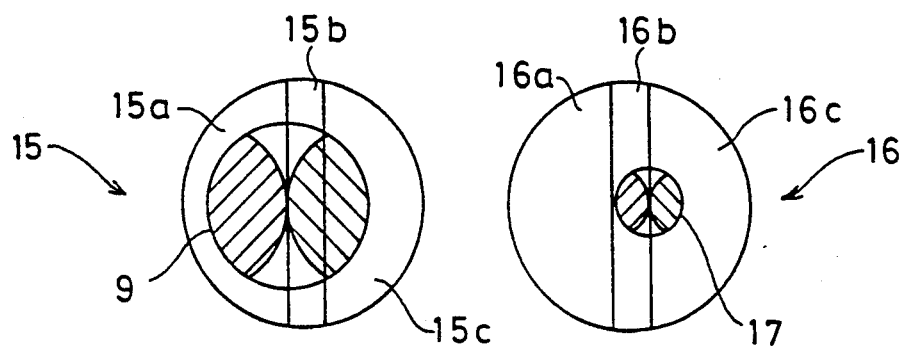
Figure 13:
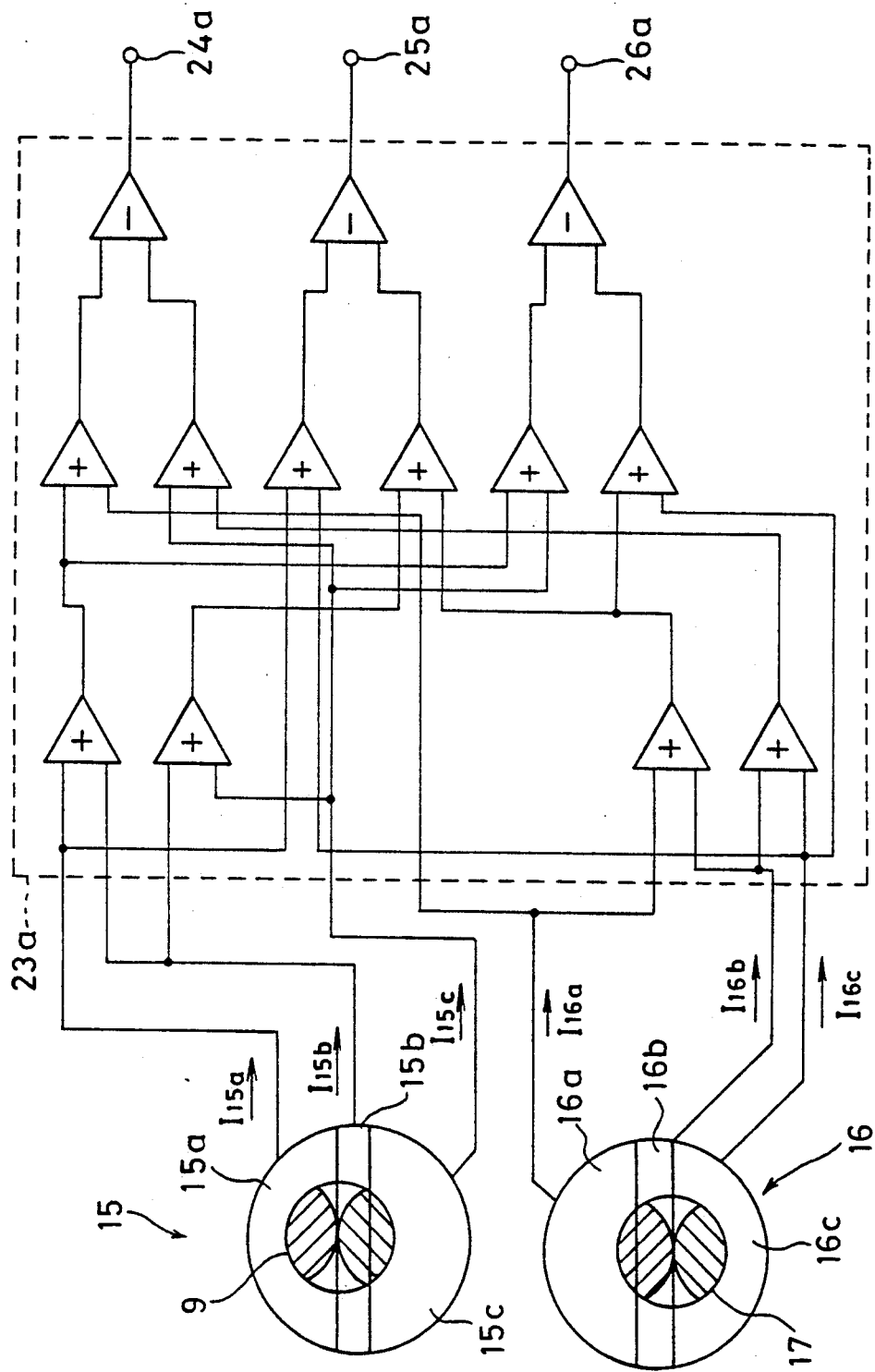
FIG. 13 is a block diagram of an example of an arithmetic circuit of an error signal generator of an optical disk drive of the embodiment of the present invention shown in FIGS. 12A through 12C.

A description will be given below of an arithmetic circuit in accordance with FIG. 11. In FIG. 11, components that are the same as the components of the light detectors 35 and 37 shown in FIGS. 10A through 10C are given the same reference notations and the descriptions thereof are omitted.

As can be seen in the figure, each of the output currents $I_{35a}$, $I_{35b}$, $I_{35c}$, $I_{35d}$, $I_{37a}$, $I_{37b}$, $I_{37c}$, and $I_{37d}$ of the photodiodes constituting each of the light detectors 35 and 37, is supplied to an arithmetic circuit $23b$ (operating means) comprising a plurality of OP amplifiers. The specified operations shown in the formulas (7), (8), and (9) are performed on these output currents by means of the arithmetic circuit $23b$, with the result that a focus error signal is output to a terminal $24b$, a tracking error signal obtained by a push-pull method is output to a terminal $25b$, and an RF signal, corresponding to the a terminal $26b$. In the operating circuit $23a$, triangles containing the symbol "+" inside represent adder circuits that output each a sum of two inputs, and triangles containing the symbol "−" inside represent subtracter circuits that output each a difference between two inputs.

According to this embodiment, that the use of general-purpose quadrant division photodiodes is allowed assures a comparatively inexpensive configuration of an MPD method error-signal generator, in comparison with using special light detectors as in the configurations of FIG. 8A through 8C.

Figure 3A:
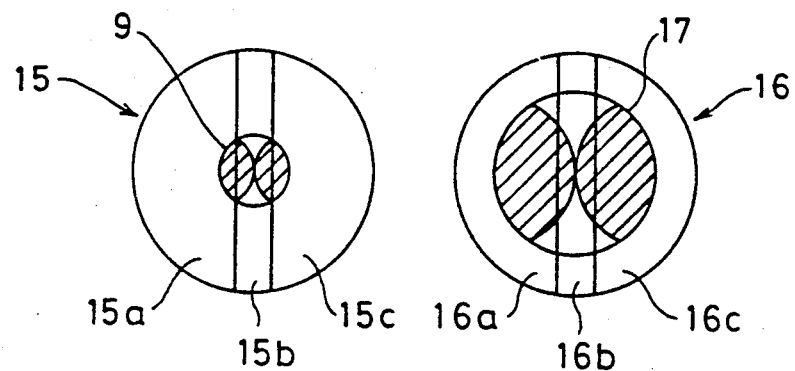
FIGS. 3A through 3C are top views of light detectors used in an error signal generator of an optical disk drive, using a conventional micro-prism detector.
Figure 3B:
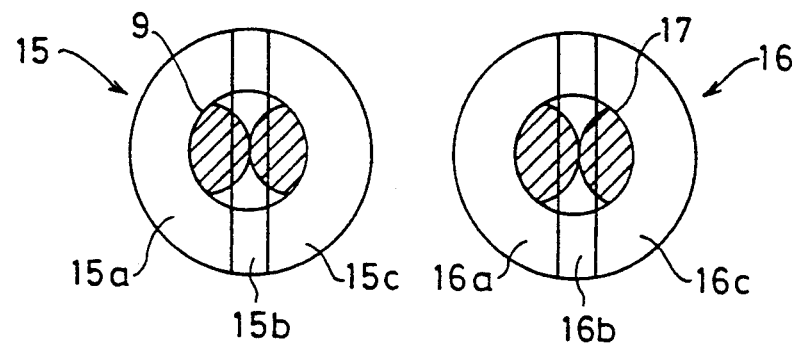
Figure 3C:
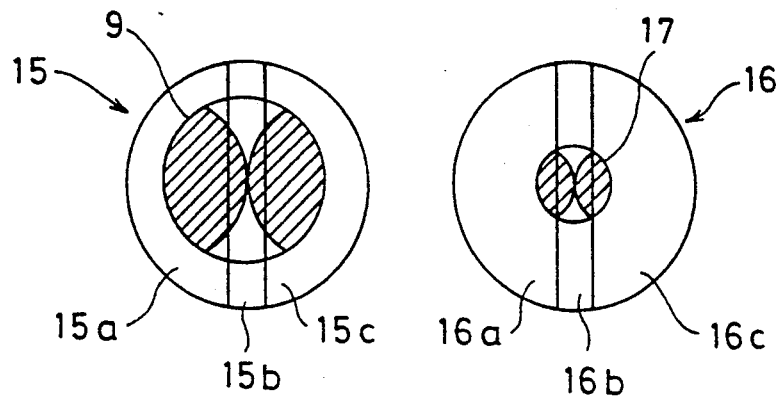
Figure 4:
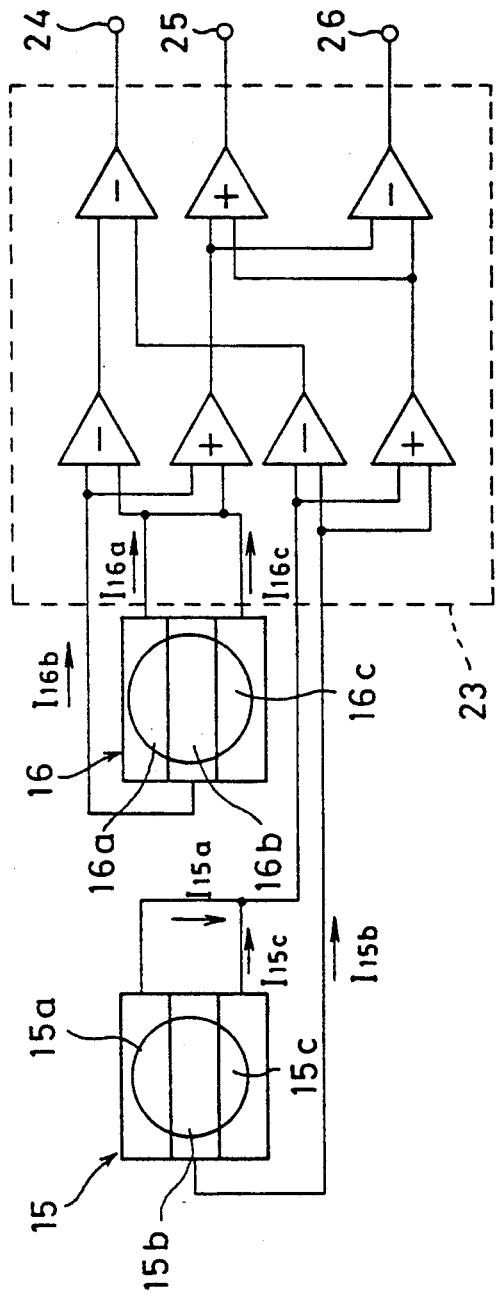
FIG. 4 is a block diagram of an example of an arithmetic circuit of an error signal generator of an optical disk drive using a conventional micro-prism detector.
Figure 5:
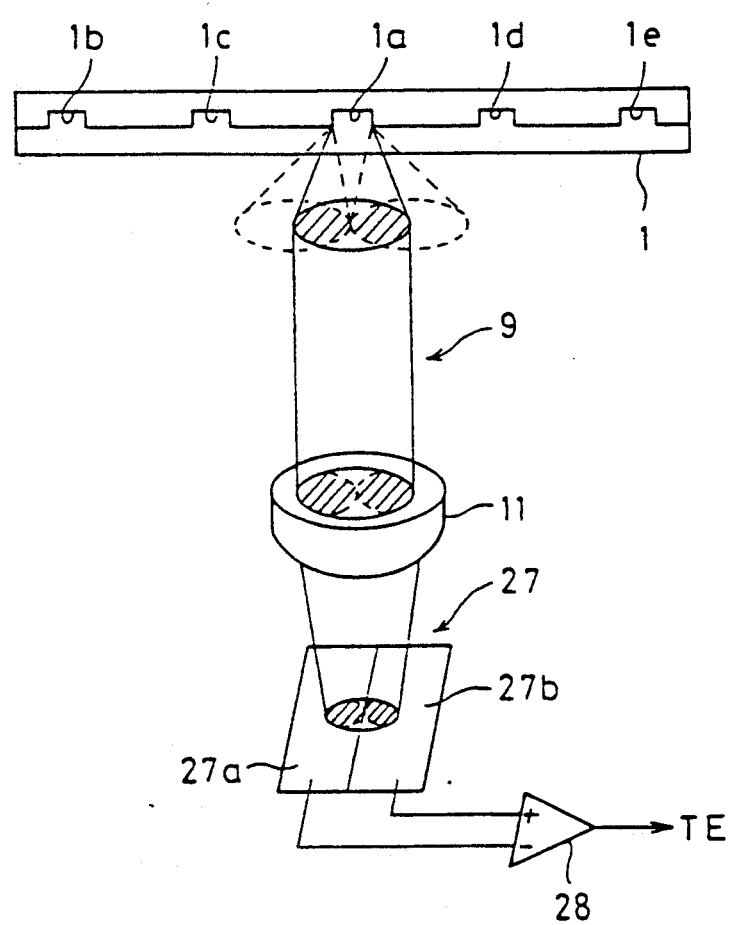
FIG. 5 is schematic diagram illustrating an error signal generator for generating a tracking error by means of a push-pull method.
Figure 6A:
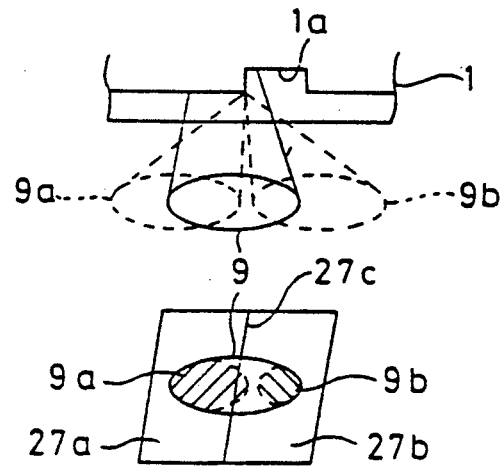
FIGS. 6A through 6C are oblique views of an optical disk and a light detector illustrating the conditions of a tracking operation by a laser beam, which operation is of a configuration shown in FIG. 5.
Figure 6B:
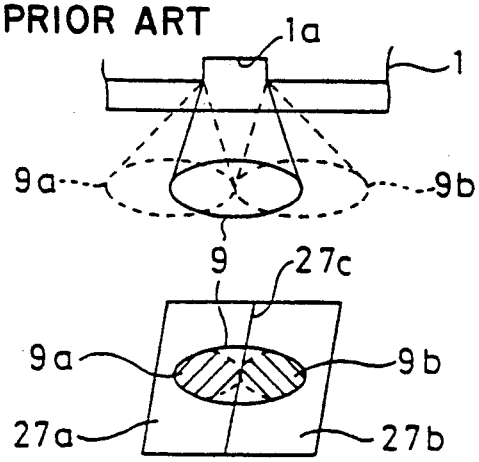
Figure 6C:
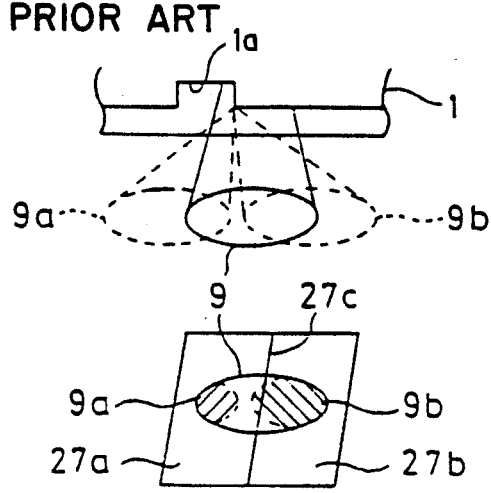

Another embodiment of the present invention is possible by means of conventional light detectors 15 and 16 shown in FIGS. 3A through 3C. A description of this embodiment will be given by referring to FIG. 12A through 12C, and FIG. 13.

The principle of this embodiment is the same as the one applied to the first embodiment, whose configuration was shown in FIGS. 8A through 9, the difference being that the positions of the first and second boundaries and the third and fourth boundaries are somewhat different. The connection of the arithmetic circuit $23a$ remains the same as in FIG. 9.

The calculations of an FE signal, TE signal obtained by means of a push-pull method, and RF signal are the same as in the first embodiment and are given by:

$$FE = I_{15a} + I_{15b} + I_{16a} - (I_{16b} + I_{16c} + I_{15c}); \quad (10)$$

the tracking error signal TE obtained by means of push-pull method is given by:

$$TE = I_{15a} + I_{16c} - (I_{15b} + I_{15c} + I_{16a} + I_{16b}) \quad (11)$$

or $$TE = I_{15a} - (I_{15b} + I_{15c}) \quad (11)'$$

or $$TE = I_{16c} - (I_{16a} + I_{16b}); \quad (11)''$$

and the RF signal is obtained as per:

$$RF = I_{15a} + I_{15b} + I_{15c} - (I_{16a} + I_{16b} + I_{16c}). \quad (12)$$

Thus, in the present invention, the first and second light detecting means can be of any shape and dimension theoretically, as long as the illumination area of the first and second reflected light fits therein. In practice, however, they should be of the least size necessary, because making a light detector too large causes light to be detected within the disk drive, which light should not be detected, thereby producing an error.

While all the described embodiments assume the use of an MO disk, it is, of course, possible that the present invention is applied to an optical disk as well.

Thus, according to the present invention, a tracking error signal with good linearity is obtained when a push-pull method tracking error signal generation is used for an optical disk with a pregroove format. This allows precision tracking control and the supplying of an RF signal substantially free from crosstalk, which crosstalk arises from reading information recorded on an adjacent track of the disk. Moreover, as an essential feature of an MPD method, an error signal generator is realized in which an optical system is easily configured using comparatively inexpensive parts. Another advantage is that, with this MPD method, the position control of optical parts is easy to perform in a disk drive due to the illumination area of a reflected light on a light detecting means always being circular, in contrast with the elliptic illumination area of a reflected light on a light detecting means in the case when focusing is not achieved in astigmatic error signal generation.

The present invention is not limited to the above-described embodiments, and variations and modifications may be made without departing from the scope of the present invention.

What is claimed is:

1. An error signal generator comprising:
   converging means for causing a first reflected light resulting from a light beam being reflected from an optical disk to converge on a first focal point, said optical disk having a continuous groove formed thereon;
   light splitting means, for splitting said first reflected light having passed through said converging means, and for causing a second reflected light to converge on a second focal point;
   first light detecting means comprising a plurality of light-sensitive elements for detecting said first reflected light, said plurality of light sensitive elements being configured such that the plurality of light-sensitive elements has at least two boundaries, that is at least a first boundary and a second boundary;
   second light detecting means comprising a plurality of light-sensitive elements for detecting said second reflected light, said plurality of light-sensitive elements being configured such that the plurality of light-sensitive elements has at least two boundaries, that is at least a third boundary and a fourth boundary; and
   operating means for generating an error signal by performing an arithmetic operation on outputs of said first and second light detecting means, wherein said error signal represents an error of a status of illumination of said light beam on said optical disk with respect to a specified predetermined status,;
   wherein said converging means, said light splitting means, said first light detecting means, and said second light detecting means are disposed so that the length of the light beam running from said converging means to said second light detecting means is different from the length of the light beam running from said converging means to said first light detecting means; and
   further wherein said converging means, said light splitting means, first light detecting means and second light detecting means are disposed so that, when said first reflected light is incident on said first light detecting means, a line located within the illumination area formed on said first light detecting means, which line corresponds to a center line of an information recording track formed on said optical disk, is substantially superimposed on said first boundary formed on said first light detecting means, said illumination area being crossed by said second boundary at predetermined distance from the center point of said illumination area; and, when said second reflected light is incident on said second light detecting means, a line located within the illumination area formed on said second light detecting means, which line corresponds to the center line on the information recording track formed on said optical disk, is substantially superimposed on said third boundary formed of said second light detecting means, said illumination area being crossed by said fourth boundary at some distance from the center point of said illumination area.

2. The error signal generator claimed in claim 1, wherein said operating means is configured such that said operating means supplies a tracking error signal, indicative of a focal point positional error of said light beam with respect to a position thereof on the recordable plane of said optical disk, said error being calculated by calculating the difference between the output of all the light-sensitive elements provided on one side of said first boundary formed on said first light detecting means and the output of the light-sensitive elements provided on the other side thereof, or by calculating the difference between the output of all the light-sensitive elements provided on one side of said third boundary formed on said second light detecting means and the output of all the light-sensitive elements provided on the other side thereof; and wherein in the operating means is also configured such that said operating means supplies a focus error signal, indicative of focal point positional error of said light beam with respect to the incidence direction of said light beam, in which incidence direction said light beam is incident on said recordable plane of said optical disk, said error being calculated by calculating the difference between the output of all of the light-sensitive elements provided on one side of said second boundary formed on said first light detecting means and the output of all of the light-sensitive elements provided on the other side thereof, and by calculating the difference between the output of all of the light-sensitive elements provided on one side of said fourth boundary formed on said second light detecting means and the output of all of the light-sensitive elements provided on the other side thereof.

3. The error signal generator as claimed in claim 1, characterized in that:
   said first and second boundaries of said first light detecting means are at right angles to each other; and said third and fourth boundaries of said second light detecting means are at right angles to each other.

4. An optical disk drive comprising the error signal generator as claimed in claim 1, wherein
information is recorded on and/or read from said optical disk.

5. The error signal generator as claimed in claim 1, wherein said first and second light detecting means are configured such that the relative position of said second boundary with respect to said first boundary, in said first light detecting means, is substantially identical to the relative position of said fourth boundary with respect to said third boundary, in said second light detecting means.

* * * * *